United States Patent
Rubrich

[11] 3,880,398
[45] Apr. 29, 1975

[54] FLUID FUSE

[76] Inventor: Lawrence M. Rubrich, 11424 Republic, Warren, Mich. 48089

[22] Filed: Feb. 8, 1974

[21] Appl. No.: 440,680

[52] U.S. Cl................................. 251/16; 137/498
[51] Int. Cl............................................ F16k 17/08
[58] Field of Search....................... 251/16; 137/498

[56] References Cited
UNITED STATES PATENTS

| 2,664,106 | 12/1953 | Livers | 251/16 |
| 2,772,065 | 11/1956 | Thomas | 251/16 |
| 2,821,209 | 1/1958 | Waterman | 251/16 X |

*Primary Examiner*—Harold W. Weakley
*Attorney, Agent, or Firm*—Burton & Parker

[57] ABSTRACT

A fluid volume limiting valve operable essentially independently of flow rate through the valve functions to stop the fluid flow when a predetermined volume of fluid has passed therethrough. The valve includes a hollow cylindrical housing having fluid inlet and outlets at opposite ends thereof. A cylindrical valve body is supported within the housing with an upstream end spaced from said inlet and a downstream end in closed communication with said outlet, with a pair of generally triangularly shaped cutouts intermediate opposite ends of the body, and a two-part piston slidably positioned within the body having an upstream fluid impervious portion and a downstream cup-shaped portion having an apertured bottom wall spaced from the upstream portion, whereby fluid flow through the valve produces a pressure drop, causing the piston to shift toward the outlet and eventually interrupt fluid flow therethrough.

10 Claims, 3 Drawing Figures

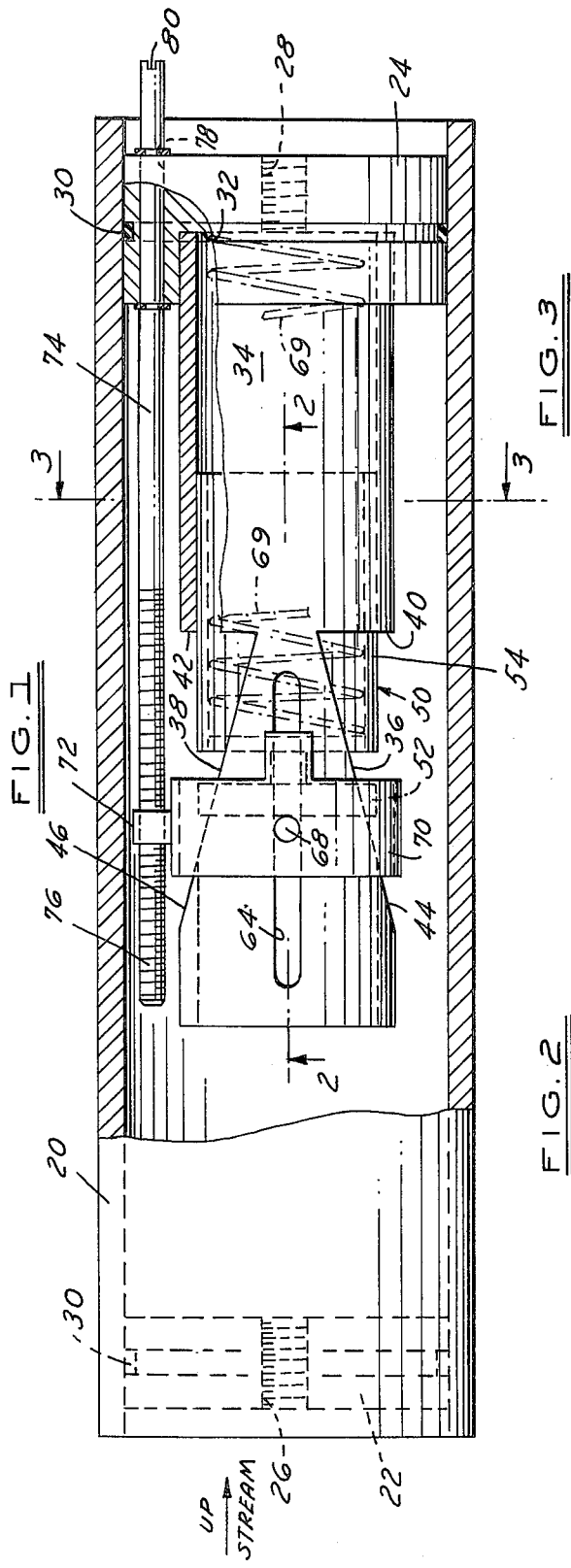
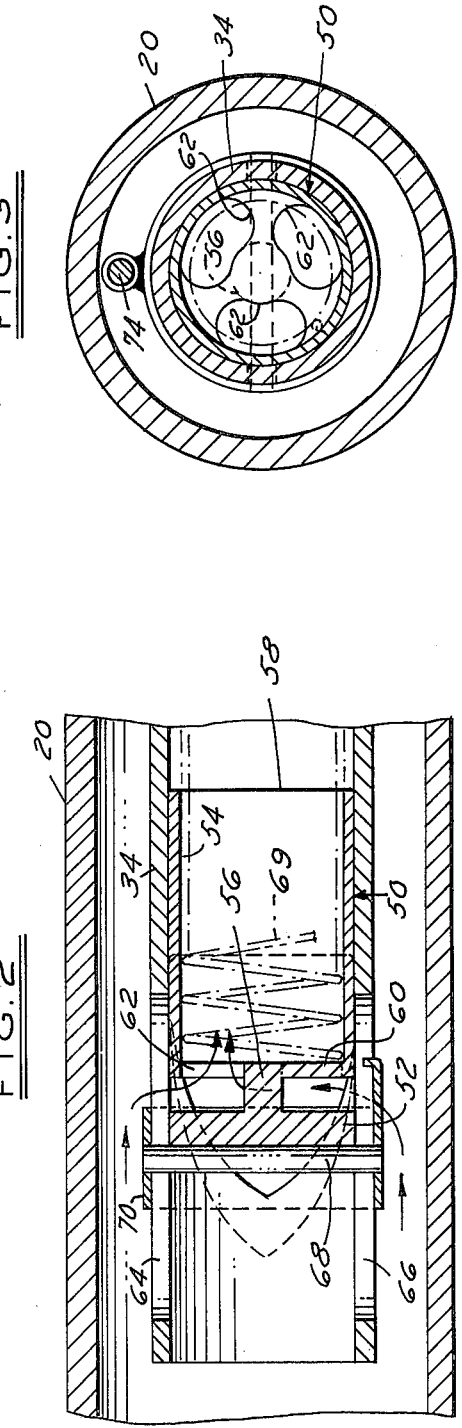

FLUID FUSE

BACKGROUND OF THE INVENTION

The invention lies generally in the field of fluid control valves, and the valve disclosed herein has particular utility as a so-called "fluid fuse." The valve is automatically responsive to the passage of a determined volume of fluid therethrough to shift the valve piston, closing the valve outlet, and thus interrupting the flow. Such a valve is useful in an environment where it is desired to monitor any malfunction of fluid flow apparatus, in that the valve may be interposed in the system to sense the malfunction, as for example a leak, and shut down the system and obviate damage to it or to the surrounding environment. The valve is also utilizable as a fluid-metering valve, and its adjustable feature lends versatility to this application.

Valves of the general character described, namely those having a piston movable to shut off flow through the valve when a predetermined quantity of fluid is passed therethrough, are shown in the prior art, as for example the valve disclosed in U.S. Pat. No. 3,184,211. U.S. Pat. No. 2,660,106 is also exemplary of this general type of valve. In both of these valves the volume of fluid which the valve allows to pass before cutting off the flow is determined by the size of a metering chamber which is filled with the fluid, the chamber expanding to its full size limit, and when such is reached the valve shuts off the flow. In the instant application, an expansion chamber which is filled as the fluid flows through the valve is not the principle of operation, but rather, a flow cutoff piston shifts in response to fluid pressure differentials between inlet and outlet ports. A bypass around the piston includes an opening which is gradually closed by the piston's travel. This opening has an area which increases in the direction of piston travel so that the distance the piston moves is linearly related to the fluid volume passing through the valve.

The valve is of extremely simple construction, comprising a minimum of separate parts, all of which are of uncomplicated configuration, thereby contributing greatly to ease of manufacture and assembly. This simplicity of construction contributes greatly to the reliability of the valve's operation. The valve construction disclosed herein in addition provides a feature of simple and convenient adjustability without removing the valve from the fluid line within which it is placed.

BRIEF DESCRIPTION OF THE DRAWINGS

FIG. 1 is a side elevation, partly in section, of a valve incorporating the instant invention;

FIG. 2 is a longitudinal section taken along the line 2—2 of FIG. 1; and

FIG. 3 is a cross-section taken along the line 3-3 of FIG. 1.

DESCRIPTION OF THE PREFERRED EMBODIMENT

Referring now more particularly to the drawings, the valve embodying the instant invention comprises a tube-like, cylindrical housing 20 closed at opposite ends by end wall means 22 and 24 at the upstream and downstream end thereof respectively. Fluid flow is normally through the valve from the left to the right as viewed in FIGS. 1 and 2. Upstream end wall 22 has a fluid inlet 26 for threaded engagement with a suitable fluid line, while downstream end wall 24 is similarly provided with a fluid outlet 28. The end walls 22 and 24 may be secured in place within housing 20 in any convenient fashion, and may incorporate O-ring seals such as shown at 30 to seal opposite ends of the housing.

End wall 24 is preferably provided with a recess or counterbore 32 within which is engaged a cylindrical valve body member 34, the end wall supporting the valve body in coaxially aligned, spaced-apart relation within the housing 20. The body 34 is formed of a hollow, elongate, cylindrical member open at opposite ends, and having a pair of diametrically opposed cutouts 36 and 38 intermediate opposite ends of its length, the cutouts being positioned toward the upstream end of the body 34, as shown in FIG. 1. The cutouts 36 and 38 are substantially triangular in configuration when viewed in elevation, as shown in FIG. 1, and are allochirally related as shown. The downstream marginal edges of the cutouts as shown at 40 and 42 respectively, lie perpendicular to the axis of the body 34, while the marginal edges shown at 44 and 46 define an acute angle with the axis of the valve, such angle preferably lying in the range of between 10° and 20°. Each cutout is of increasing cross section from its upstream to its downstream end.

The cutouts or openings 36 and 38 increase in area, as mentioned above, in the direction from the upstream toward the downstream end of the cylinder 34. This increase in area in relation to the axial extent of the openings is calculated to provide a linear relation between travel of the piston 50 and the fluid volume passing through the valve essentially independently of flow rate. The number and angular position of such cutouts is optional.

Disposed within the valve body 34 is a fluid piston generally indicated by the numeral 50, the piston including an upstream portion 52 and a downstream portion 54, each closely fitting within the valve body 34 for slidable movement therewithin. The piston portions 52 and 54 are connected by a short, axially extending intermediate portion 56. The upstream piston portion 52 is solid and fluid impervious, while the downstream portion 54 is cup-shaped, having an open downstream end 58 and a bottom wall 60 which is provided with a plurality of apertures therethrough, such as shown at 62 in FIG. 3. In the illustrated embodiment, the apertures 62 are three in number, and are somewhat kidney-shaped, being spaced uniformly about the axis of the wall 60. It will be obvious to one skilled in the art that other aperture configurations might be used.

Valve body 34 is also provided with a pair of diametrically opposed, elongate slots 64 and 66 which extend from a point spaced from the upstream end of the body 34 to a point spaced slightly upstream of the ends 40 and 42 of the cutouts in the valve body. Extending between and engaged within the slots 64 and 66 is a stop pin 68 provided with a cylindrical collar 70 encircling the valve body 34. The stop pin 68 may be fixedly secured to the collar 70 in any convenient fashion such as by peening its opposite ends or by welding. Mounted exteriorly of the collar 70 is an internally threaded nut-like member 72, which may be formed integral with or fixed to the collar as by welding. An elongate rod 74 having a threaded end portion 76 is threadably engaged within the member 72, and has a free end which projects through a suitable aperture 78 in the end wall 24. Obviously, the rod 74 could be reversed, extending in the opposite direction through end wall 22. Rod 74 may be provided with a slot 80 with which a screwdriver or similar tool is engageable for rotating the rod, thereby adjusting the stop pin 68 longitudinally of the slots 64 and 66.

Fluid entering the port 26 in end wall 22 flows through housing 20, a portion of the fluid flowing within valve body 34 against piston portion 52, while the remaining fluid flows around valve body 34, between piston portions 52 and 54, and through the apertures 62 in piston portion 54, and thence out of the valve through port 28. The fluid flowing through the apertures 62 creates a pressure drop whereby the fluid on the lefthand side of the piston portion 52 acting thereagainst is at a higher pressure than the fluid downstream thereof. This differential in pressure shifts the piston 50 toward the right as viewed in FIGS. 1 and 2, and as the flow continues, the piston will move toward the right until it reaches a position where portion 52 enters the body 34 downstream of the cutouts 36 and 38, thus shutting off flow through the valve. As can be seen from FIG. 1, the portion of the valve body 34 downstream of the cutouts must be of a sufficient length to enable the piston portion 52 to enter before the piston portion 54 abuts end wall 24.

As can be seen from FIG. 1 and FIG. 2, the stop pin 68 determines the upstream position of piston 50, and hence the distance that the piston 50 must travel to shut off flow through the valve. For a given flow rate, the position of the stop pin 68 will therefore determine the amount of fluid flow necessary to shut the valve. With the simple adjustment feature provided as above described, the stop pin may be easily and conveniently positioned to vary the amount of flow necessary to actuate the valve to its closed position. Once the valve has been shut by movement of the piston 50 to the right end wall 24, the valve may be conveniently reset by reverse flow of fluid through the valve, i.e. by introducing fluid through port 28. The valve may also be reset by the interposition of a light spring shown in phantom outline at 69 between the downstream end of the piston 50 and the end wall 24, whereby upon the release of pressure due to fluid entering through port 26, the spring will return the piston to its position against stop pin 68.

What is claimed is:

1. A fluid volume limiting valve comprising, in combination:
   a housing having fluid inlet and outlet ports,
   a hollow cylinder in said housing communicating at one end with one of said ports and at the other end with the interior of the housing,
   a piston in said cylinder having a wall portion for blocking fluid flow through the cylinder between the interior of said housing and said one port and responsive to fluid pressure differentials therebetween to shift the piston in the cylinder,
   a lateral opening through a side wall of the cylinder in bypassing relation with said wall portion of the piston for establishing communication between the interior of said housing and said one port,
   said lateral opening increasing in area from one end to the other in the direction of piston travel, and said piston having a wall portion for gradually blocking said lateral opening during said piston travel.

2. The invention defined by claim 1 characterized in that said lateral opening increases in area in the direction of and in relation to piston travel sufficient to establish a substantially linear relationship between piston travel and fluid volume.

3. The invention defined by claim 2 characterized in that said one port is the outlet port and piston travel in a direction to block said lateral opening is travel toward that end of the cylinder communicating with the outlet port.

4. A fluid control valve comprising an elongate cylindrical housing having fluid inlet and outlet ports at opposite ends, a cylindrical valve body extending axially within said housing and having a downstream end communicating with said outlet port and an upstream end opening into the housing, a cutout in said valve body intermediate opposite ends thereof increasing in area from the upstream toward the downstream end thereof, a piston in said valve body for slidable movement therein, said piston having a fluid impervious upstream piston portion, a cup-shaped downstream piston portion with an open end adjacent said outlet and an apertured bottom wall adjacent said upstream portion, and an intermediate portion connecting said two piston portions in spacedapart relation, and stop means disposed in the path of said piston upstream thereof for limiting piston movement.

5. A fluid control valve as defined in claim 4 characterized in that said valve body is supported coaxially in said housing on said end wall defining said fluid outlet port.

6. A fluid control valve as defined in claim 5 characterized in that there are two of said cutouts in the valve body and such cutouts are allochirally arranged with the bases lying perpendicular to the body axis and the sides lying in planes defining an acute angle with said axis.

7. A fluid control valve as defined in claim 5 characterized in that the overall length of said piston is equal to or less than the length of that portion of the valve body downstream of said cutouts.

8. A fluid control valve as defined in claim 4 characterized in that said stop means is mounted on said valve body for axially adjustable movement therealong.

9. A fluid control valve as defined in claim 8 characterized in that said valve body has a pair of diametrically opposed elongate slots, and said stop means comprises a pin extending between and engaging said slots, and means are provided for adjustably positioning said pin along said slots.

10. A fluid control valve as defined in claim 9 characterized in that said adjustable positioning means comprises an internally threaded collar coupled to said pin for movement therewith, and an externally threaded elongate rod threadably engaged with said collar and projecting through and beyond one of said housing end walls.

* * * * *